(12) United States Patent
Aoshima et al.

(10) Patent No.: US 7,733,438 B2
(45) Date of Patent: Jun. 8, 2010

(54) LIQUID CRYSTAL DISPLAY DEVICE

(75) Inventors: Kenji Aoshima, Ishikawa-gun (JP);
Hiroshi Nagahama, Kanazawa (JP)

(73) Assignee: Toshiba Matsushita Display Technology Co., Ltd., Tokyo (JP)

(*) Notice: Subject to any disclaimer, the term of this patent is extended or adjusted under 35 U.S.C. 154(b) by 978 days.

(21) Appl. No.: 11/446,386

(22) Filed: Jun. 5, 2006

(65) Prior Publication Data

US 2006/0274221 A1 Dec. 7, 2006

(30) Foreign Application Priority Data

Jun. 6, 2005 (JP) ............... 2005-165467

(51) Int. Cl.
*G02F 1/1335* (2006.01)
(52) U.S. Cl. .......................... 349/62; 349/64
(58) Field of Classification Search ............ 349/61–65, 349/96–98, 117–119
See application file for complete search history.

(56) References Cited

U.S. PATENT DOCUMENTS 7,327,417 B2 * 2/2008 Kitagawa et al. .............. 349/65

2006/0262253 A1 * 11/2006 Teramoto et al. ............ 349/110

FOREIGN PATENT DOCUMENTS

| JP | 2004-8705 | 1/2004 |
| JP | 2007-127940 | * 5/2007 |

* cited by examiner

*Primary Examiner*—Dung T. Nguyen
(74) *Attorney, Agent, or Firm*—Oblon, Spivak, McClelland, Maier & Neustadt, L.L.P.

(57) ABSTRACT

An area light source device, which is disposed between a liquid crystal display panel and a display medium and illuminates the liquid crystal display panel from a back side thereof, includes a light source, a light guide, and a first optical sheet and a second optical sheet which are stacked between the liquid crystal display panel and the light guide and impart predetermined optical characteristics to emission light emerging from the light guide. The first optical sheet is disposed on the liquid crystal display panel side, and the second optical sheet is disposed on the light guide side. The first optical sheet and the second optical sheet have opening parts opposed to the display medium, and the first optical sheet is disposed to cover edges that define the opening part of the second optical sheet.

2 Claims, 3 Drawing Sheets

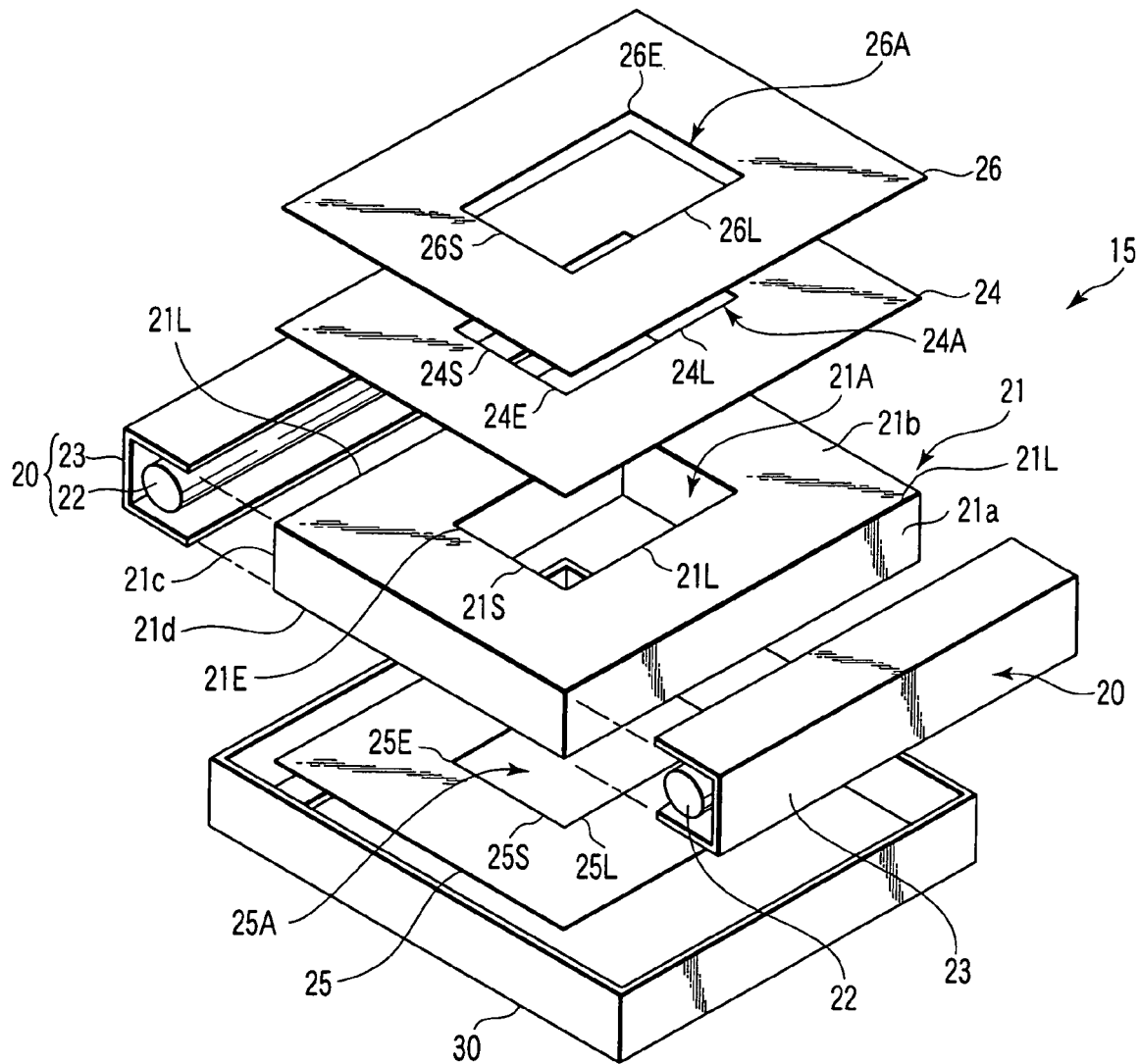
F I G. 2

LIQUID CRYSTAL DISPLAY DEVICE

CROSS-REFERENCE TO RELATED APPLICATIONS

This application is based upon and claims the benefit of priority from prior Japanese Patent Application No. 2005-165467, filed Jun. 6, 2005, the entire contents of which are incorporated herein by reference.

BACKGROUND OF THE INVENTION

1. Field of the Invention

The present invention relates generally to a liquid crystal display device, and more particularly to a liquid crystal display device including a transmissive liquid crystal display panel and an area light source device that illuminates the transmissive liquid crystal display panel.

2. Description of the Related Art

Liquid crystal display devices have been applied to various fields as display devices for OA equipment and information terminal devices such as personal computers, taking advantage of their features of light weight, small thickness and low power consumption. In recent years, the liquid crystal display devices have also been applied to game machines such as slot machines. A liquid crystal display panel, which is mounted on a game machine, is, for example, fitted on the front surface of the casing of the game machine.

The liquid crystal display panel includes a display section that is capable of displaying an image, and includes, at a central part thereof, a transmissive section that makes it possible to view from outside a lottery result that is based on pictures on a display medium, that is, a rotary reel, which is contained in the casing of the game machine. This liquid crystal display panel has basically the same structure as a liquid crystal display panel for ordinary uses. A light-emitting unit, which is disposed between the liquid crystal display panel and the rotary reel, has a substantially rectangular opening part which corresponds in position to the transmissive section of the liquid crystal display panel (see, for instance, Jpn. Pat. Appln. KOKAI Publication No. 2004-8705).

Specifically, the light-emitting unit includes a backlight which illuminates the liquid crystal display panel, and a diffusion plate which diffuses illumination light from the backlight. The backlight and the diffusion plate have substantially rectangular opening parts which correspond in position to the rotary reel. Thereby, the visibility of the rotary reel is improved without interference between the rotary reel and the light-emitting unit.

BRIEF SUMMARY OF THE INVENTION

The object of the invention is to provide a liquid crystal display device capable of improving the display quality of a liquid crystal display panel, and improving the visibility of a display medium that is disposed behind the liquid crystal display panel.

According to an aspect of the present invention, there is provided a liquid crystal display device comprising: a transmissive liquid crystal display panel which is disposed on a front side of a display medium that effects variable display; and an area light source device which is disposed between the liquid crystal display panel and the display medium and illuminates the liquid crystal display panel from a back side thereof, the area light source device including: a light source; a light guide which has an opening part opposed to the display medium and emits radiation light from the light source toward the liquid crystal display panel; and a first optical sheet and a second optical sheet which are stacked between the liquid crystal display panel and the light guide and impart predetermined optical characteristics to emission light emerging from the light guide, wherein the first optical sheet is disposed on the liquid crystal display panel side, and the second optical sheet is disposed on the light guide side, each of the first optical sheet and the second optical sheet has opening part opposed to the display medium, and the first optical sheet is disposed to cover edges that define the opening part of the second optical sheet.

The present invention can provide a liquid crystal display device capable of improving the display quality of a liquid crystal display panel, and improving the visibility of a display medium that is disposed behind the liquid crystal display panel.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is an exploded perspective view that schematically shows the structure of a backlight that is mountable on the liquid crystal display device shown in FIG. 1;

DETAILED DESCRIPTION OF THE INVENTION

A liquid crystal display device according to an embodiment of the present invention, in particular, a liquid crystal display device that is applicable to a game machine, will now be described with reference to the accompanying drawings.

Figure 1:
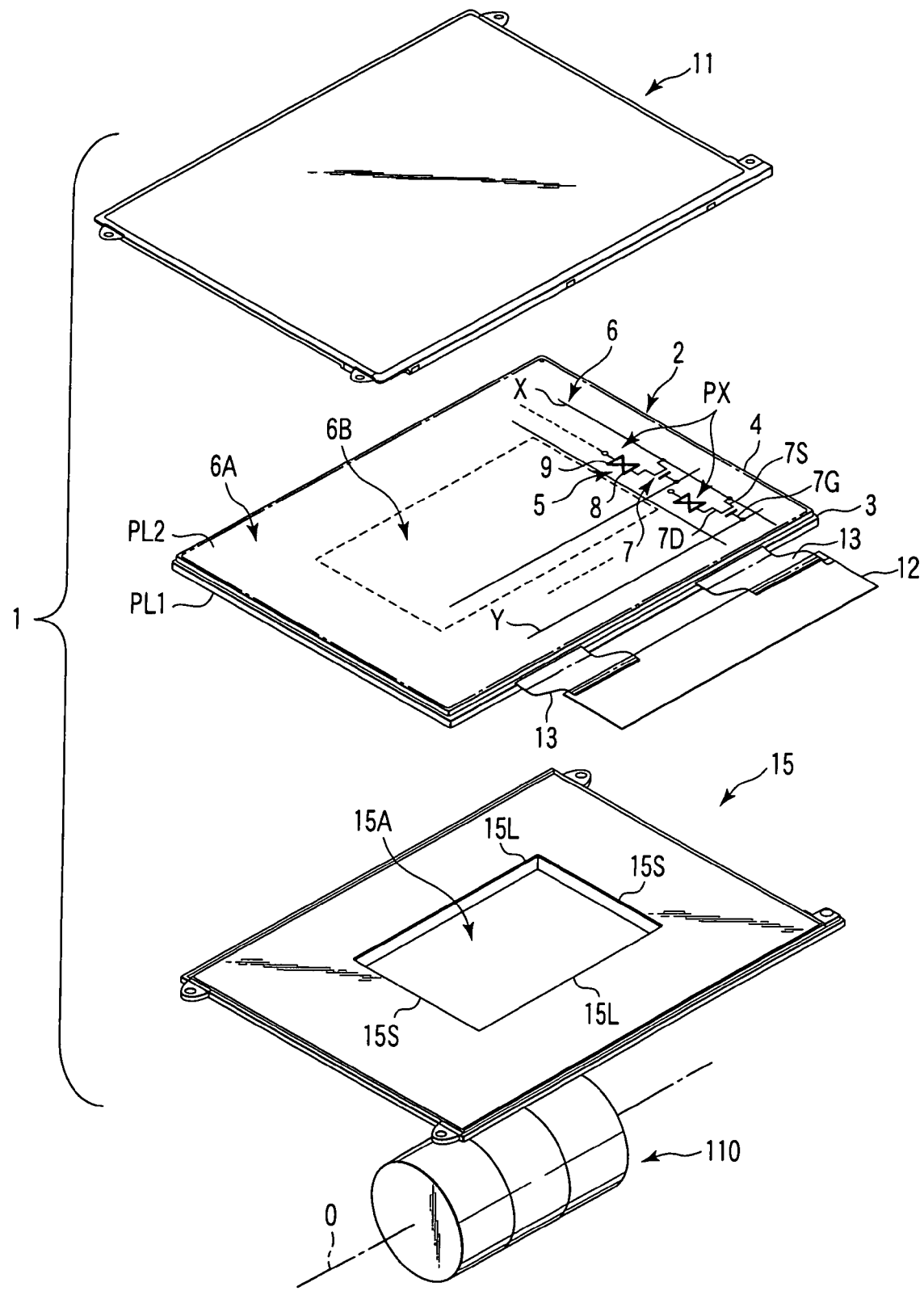
FIG. 1 is an exploded perspective view that schematically shows the structure of a liquid crystal display device according to an embodiment of the present invention.

As is shown in FIG. 1, a liquid crystal display device 1 includes a substantially rectangular, planar transmissive liquid crystal display panel 2. The liquid crystal display panel 2 is configured such that a liquid crystal layer 5 that serves as an optical modulation layer is interposed between a pair of substrates, that is, an array substrate 3 and a counter-substrate 4. The liquid crystal display panel 2 includes a substantially rectangular effective section 6 that displays an image. The effective section 6 is composed of a plurality of display pixels PX that are arrayed in a matrix. In addition, the effective section 6 includes an image display section 6A which is configured to mainly display an image, and a substantially rectangular transmissive display section 6B which makes a display medium (to be described later) visible.

The array substrate 3 includes, in the effective section 6, a plurality of scan lines Y that extend in a row direction of the display pixels PX, a plurality of signal lines X that extend in a column direction of the display pixels PX, switching elements 7 that are arranged near intersections between scan lines Y and signal lines X in association with the respective display pixels PX, and pixel electrodes 8 that are connected to the switching elements 7.

The switching element 7 is formed of, e.g. a thin-film transistor (TFT). The switching element 7 has a gate electrode 7G that is electrically connected to the associated scan line Y (or formed integral with the scan line). The switching element 7 has a source electrode 7S that is electrically connected to the associated signal line X (or formed integral with the signal line). The switching element 7 has a drain electrode 7D that is electrically connected to the pixel electrode 8 of the associated display pixel PX.

The counter-substrate 4 includes, in the effective section 6, a counter-electrode 9 that is common to all the display pixels PX. The pixel electrodes 8 and counter-electrode 9 are formed of an electrically conductive material with light transmissivity such as ITO (indium tin oxide). The array substrate 3 and counter-substrate 4 are disposed such that the pixel electrodes 8 and counter-electrode 9 are opposed to each other, and a gap is formed between array substrate 3 and counter-substrate 4. The liquid crystal layer 5 is formed of a liquid crystal composition that is sealed in the gap between the array substrate 3 and counter-substrate 4.

In the liquid crystal display panel 2, a pair of polarizer plates PL1 and PL2, whose directions of polarization are set in accordance with the characteristics of the liquid crystal layer 5, are provided on the outer surface of the array substrate 3 and the outer surface of the counter-substrate 4.

In a color-display type liquid crystal display device, the liquid crystal display panel 2 includes a plurality of kinds of display pixels, for instance, a red pixel that displays red (R), a green pixel that displays green (G), and a blue pixel that displays blue (B). Specifically, the red pixel has a red color filter that passes light with a principal wavelength of red. The green pixel has a green color filter that passes light with a principal wavelength of green. The blue pixel has a blue color filter that passes light with a principal wavelength of blue. These color filters are disposed on the major surface of the array substrate 3 or counter-substrate 4.

The liquid crystal display panel 2 with the above-described structure is disposed between a bezel cover 11 having a rectangular frame-like shape and a backlight 15 functioning as an area light source device. Specifically, the backlight 15, together with the liquid crystal display panel 2, is formed integral with the bezel cover 11 in the state in which the upper surface of the backlight 15 is opposed to the back surface (array substrate-side surface) of the liquid crystal display panel 2. The backlight 15 illuminates the liquid crystal display panel 2 from the back side thereof.

A driver circuit 12, which supplies a drive signal to the liquid crystal display panel 2, is electrically connected to one side edge of the liquid crystal display panel 2 via a flexible printed circuit board 13. The driver circuit 12 is disposed on the back side of the backlight 15 by bending the printed circuit board 13.

As is shown in FIG. 2, the backlight 15 includes a light source unit 20 and a light guide 21. The light source unit 20 includes a cold-cathode fluorescent lamp 22 functioning as a light source and a lamp reflector 23. Specifically, the cold-cathode fluorescent lamp 22 is an elongated cylindrical tubular light source that extends in the longitudinal direction of the substantially rectangular light guide 21. The lamp reflector 23 reflects emission light, which comes from the cold-cathode fluorescent lamp 22, toward the light guide 21. The lamp reflector 23 is disposed so as to surround the cold-cathode fluorescent lamp 22.

The light guide 21 is formed of a light transmissive resin material such as an acrylic resin or a polycarbonate resin. The light guide 21 is formed in a substantially rectangular shape and has a substantially uniform thickness as a whole. The light guide 21 has a first major surface 21b that faces the liquid crystal display panel 2, a second major surface 21d that is opposed to the first major surface 21b, and a first side surface 21a and a second side surface 21c that connect the first major surface 21b and second major surface 21d.

In this embodiment, the light source unit 20 is disposed along each of a pair of long sides 21L of the light guide 21. Specifically, the cold-cathode fluorescent lamps 22 are disposed to be substantially parallel to the first side surface 21a and second side surface 21c along the long sides 21L of the light guide 21. To be more specific, the first side surface 21a and second side surface 21c of the light guide 21 correspond to light incidence surfaces, on which emission light from the cold-cathode fluorescent lamp 22 is incident.

The light guide 21 with the above structure is capable of propagating emission light, which has been made incident from the cold-cathode fluorescent lamps 22 through the first side surface 21a and second side surface 21c, and is capable of emitting the propagated light from the first major surface 21b. The first major surface 21b of the light guide 21 correspond to a light emission surface for emitting the light that has entered the light guide 21.

An optical sheet (second optical sheet) 24 has a substantially rectangular shape, which has substantially the same outside dimensions as the light guide 21. The optical sheet 24 is disposed so as to cover the first major surface 21b of the light guide 21. The optical sheet 24 imparts predetermined optical characteristics to the emission light from the first major surface 21b of the light guide 21. The optical sheet 24 is, for instance, a light converging sheet that converges emission light from the first major surface 21b.

An optical sheet (first optical sheet) 26 has a substantially rectangular shape, which has substantially the same outside dimensions as the light guide 21. The optical sheet 26 is superposed on the optical sheet 24. The optical sheet 26 imparts predetermined optical characteristics to the emission light from the first major surface 21b of the light guide 21. The optical sheet 26 is, for instance, a light diffusion sheet that diffuses emission light from the first major surface 21b.

A substantially rectangular optical sheet 25 is disposed so as to cover the second major surface 21d of the light guide 21. The optical sheet 25 is a reflection sheet with a reflection function that reflects light. Specifically, part of emission light from the cold-cathode fluorescent lamps 22, which has entered the light guide 21, leaks from the second major surface 21d. The optical sheet 25 reflects the light, which leaks from the second major surface 21d, back to the light guide 21.

The light source unit 20, light guide 21 and optical sheets 24, 25 and 26 are accommodated in a substantially rectangular frame 30.

The liquid crystal display device with the above-described structure operates as follows. Electric energy is supplied to the cold-cathode fluorescent lamps 22 of the paired light source units 20, thereby turning on the cold-cathode fluorescent lamps 22. Part of emission light from the cold-cathode fluorescent lamps 22 is reflected by the inner surfaces of the lamp reflectors 23 that cover the cold-cathode fluorescent lamps 22, and is made to travel toward the first side surface 21a and second side surface 21c of the light guide 21. In addition, part of the emission light is directly guided to the first side surface 21a and second side surface 21c. The incident light that has entered the light guide 21 through its first side surface 21a and second side surface 21c propagates within the light guide 21 and is refracted or reflected toward the first major surface 21b of the light guide 21. Light leaking from the second major surface 21d of the light guide 21 is reflected back into the light guide 21 by the optical sheet 25.

While the emission light from the first major surface 21b of the light guide 21 is passing through the optical sheets 24 and 26, the light is given predetermined optical characteristics. For example, the light is properly converged or diffused. Thereby, the luminance of the emission light from the first major surface 21b of the light guide 21 is enhanced and made uniform.

Illumination light from the backlight 15, that is, light emerging from the optical sheet 26, is led to the back surface (array substrate-side surface) of the liquid crystal display panel 2. The illumination light that is led to the liquid crystal display panel 2 selectively passes through the effective section 6 of the liquid crystal display panel 2. Thereby, an image is displayed on the effective section 6 of the liquid crystal display panel 2.

Figure 3:
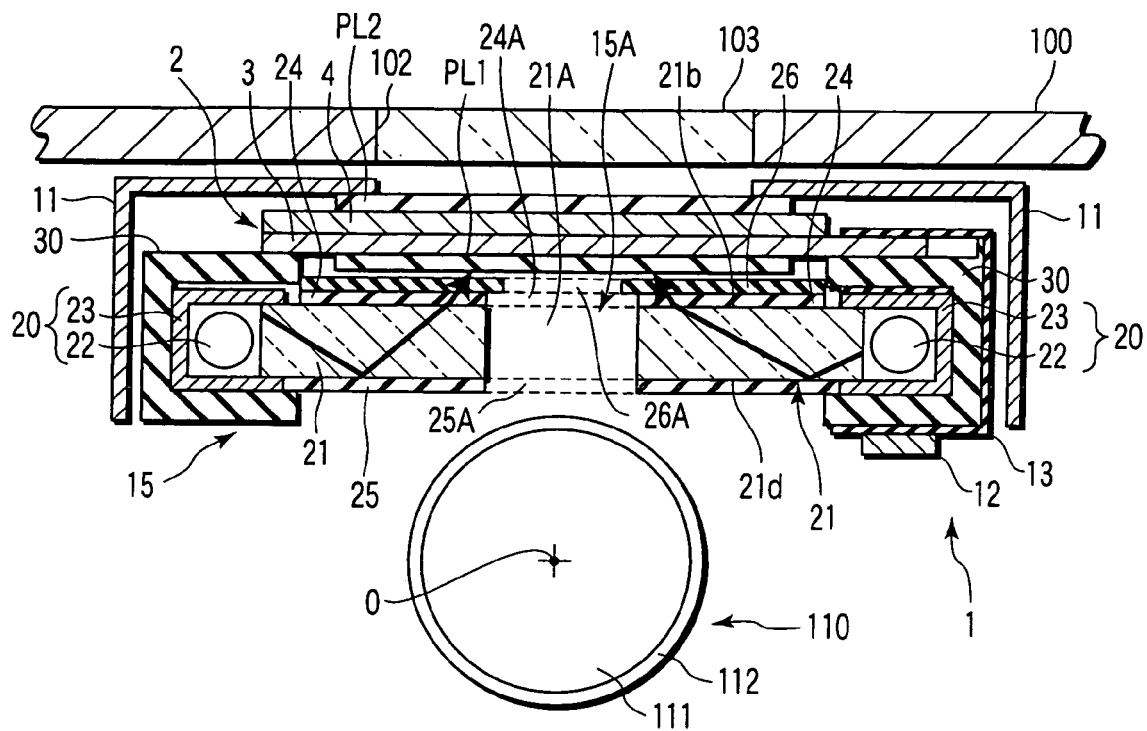
FIG. 3 is a cross-sectional view that schematically shows the structure of a liquid crystal display device which is applied to a game machine.

Next, a description is given of a liquid crystal display device 1 that is used for a game machine such as slot machine. As is shown in FIG. 1 and FIG. 3, the game machine includes a rotary reel 110 that is rotatably disposed within a casing 100 as a display medium for effecting variable display. The rotary reel 110 comprises a plurality (e.g. three) cylindrical reel bodies 111 that are rotatable about a rotational axis O. In the example shown in FIG. 1, the three reel bodies 111 are arranged in the direction of the rotational axis O. Strip-like reel tapes 112 are attached to the cylindrical surfaces of the reel bodies 111. The reel tape 112 has a plurality of pictures that are arranged at equal intervals.

The liquid crystal display device 1 is disposed on the front side (i.e. viewer's side) of the rotary reel 110 within the casing 100. Specifically, the liquid crystal display panel 2 is disposed on the front side of the rotary reel 110, and the backlight 15 is disposed between the liquid crystal display panel 2 and the rotary reel 110. The casing 100 has a window section 102 that permits viewing of an image that is displayed on the liquid crystal display device 1 and viewing of the rotary reel 110. The window section 102 is equipped with a light-transmissive protection plate 103 such as a glass plate.

The backlight 15, which is mounted on the liquid crystal display device 1, includes an opening part 15A in its substantially central part in such a manner that the position of the opening part 15A corresponds to the position of the rotary reel 110. Specifically, as shown in FIG. 2, the light guide 21 has an opening part 21A which is opposed to the rotary reel 110. Similarly, the optical sheets 24 and 26 have opening parts 24A and 26A at positions corresponding to the opening part 21A. Further, the optical sheet 25 has an opening part 25A at a position corresponding to the opening part 21A. The opening part 15A of the backlight 15 makes visible a predetermined number of pictures on the rotary reel 110, which is disposed on the back side of the backlight 15.

Thereby, the weight of the light guide 21 is reduced, and accordingly the weight of the liquid crystal display device 1 can be reduced. Since the rotary reel 110 is visible without intervention of the backlight 15, the visibility of the rotary reel 110 can be enhanced.

The plural sheets 24 and 26 are disposed between the liquid crystal display panel 2 and light guide 21. By optimizing the combination and relative position of these optical sheets, emission light emerging from the light guide 21 can efficiently be guided to the liquid crystal display panel 2. Hence, the display quality, in particular, the luminance of the image that is displayed on the image display section 6A of the liquid crystal display panel 2 can be improved.

In the case where the opening parts 24A and 26A of the same dimensions are formed in the sheets 24 and 26 which are disposed between the liquid crystal display panel 2 and light guide 21, the edges that define the opening parts are viewed in a randomly varying fashion due to non-uniformity in cutting precision of the opening parts or non-uniformity in disposition of the optical sheets. As a result, the appearance of the part of the liquid crystal display panel 2, which is in the vicinity of the transmissive display section 6B, may become poor.

To cope with this problem, the optical sheet 26, which is disposed on the liquid crystal display panel 2 side is disposed so as to cover edges 24E that define the opening part 24A of the optical sheet 24 which is disposed on the light guide 21 side. To be more specific, the optical sheets 24 and 26 have substantially rectangular shapes with substantially equal outside dimensions, but the opening part 26A of the optical sheet 26 is formed to have smaller dimensions than the opening part 24A of the optical sheet 24.

Accordingly, even if there occurs non-uniformity in cutting precision of the opening parts or in disposition of the optical sheets, only edges 26E that define the opening part 26A of the optical sheet 26, which is one of the optical sheets disposed between the liquid crystal display panel 2 and the light guide 21, are visually recognized. Therefore, the appearance of the part of the liquid crystal display panel 2, which is in the vicinity of the transmissive display section 6B, can be improved.

In this embodiment, as shown in FIG. 1, the opening part 15A of the backlight 15 has a substantially rectangular shape with a pair of long sides 15L along the direction of arrangement of the three reel bodies 111 (the direction of the rotational axis), and a pair of short sides 15S which are perpendicular to the long sides 15L.

Specifically, as shown in FIG. 2, the opening parts 21A, 24A, 25A and 26A of the light guide 21 and optical sheets 24, 25 and 26 have substantially rectangular shapes. Edges 21E that define the opening part 21A of the light guide 21 comprise long sides 21L corresponding to the long sides 15L, and short sides 21S corresponding to the short sides 15S. Similarly, the edges 24E that define the opening part 24A of the optical sheet 24 comprise long sides 24L corresponding to the long sides 15L, and short sides 24S corresponding to the short sides 15S. Edges 25E that define the opening part 25A of the optical sheet 25 comprise long sides 25L corresponding to the long sides 15L, and short sides 25S corresponding to the short sides 15S. The edges 26E that define the opening part 26A of the optical sheet 26 comprise long sides 26L corresponding to the long sides 15L, and short sides 26S corresponding to the short sides 15S.

Figure 4:
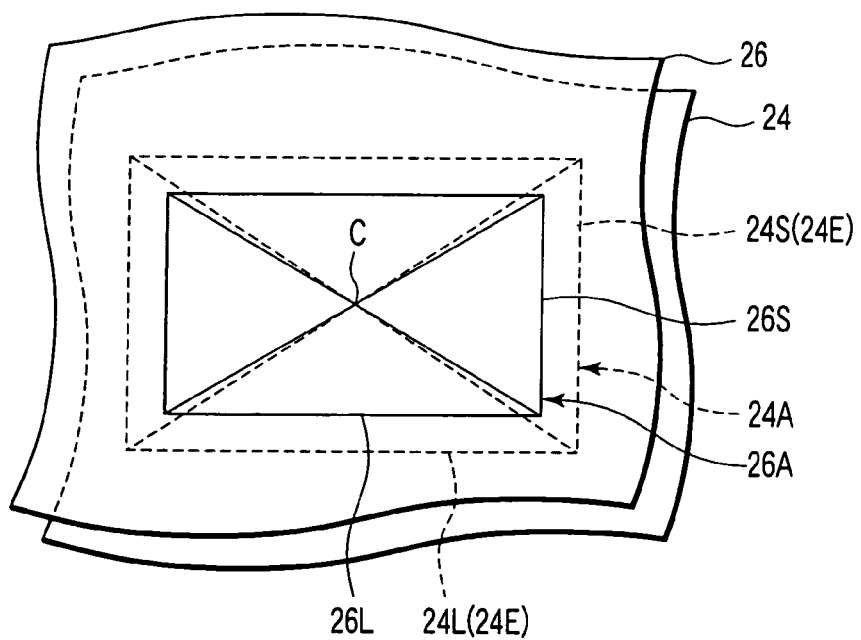
FIG. 4 is a schematic plan view for explaining a positional relationship between opening parts which are formed in an optical sheet disposed on a light guide side and in an optical sheet disposed on a liquid crystal display panel side in the backlight shown in FIG. 2.

In the above structure, as shown in FIG. 4, the opening part 26A of the optical sheet 26, which is disposed on the liquid crystal display panel 2 side, is formed to have smaller dimensions than the opening part 24A of the optical sheet 24 which is disposed on the light guide 21 side. Specifically, the long sides 26L and short sides 26S that define the opening part 26A are shorter than the long sides 24L and short sides 24S that define the opening part 24A (26L<24L, 26S<24S). In this case, the opening part 26A is formed such that its center C (i.e. an intersection of diagonals of the opening part 26A) agrees with the center of the opening part 24A (i.e. an intersection of diagonals of the opening part 24A). The opening part 26A is formed to have at least dimensions corresponding to an area in which the rotary reel 110 is to be exposed.

Thus, all the four sides 24L and 24S (24E), which define the opening part 24A of the optical sheet 24 disposed under the optical sheet 26 (i.e. on the light guide 21 side of the optical sheet 26), are covered by the optical sheet 26. Thereby, the edges that define the openings of plural optical sheets are not exposed, and the display quality can be improved.

Further, it is preferable that the opening part 26A of the optical sheet 26 be formed to have dimensions less than not only the dimensions of the opening part 24A of the optical sheet 24 but also the dimensions of the opening part 21A of the light guide 21. Specifically, the long sides 26L and short sides 26S that define the opening part 26A are shorter than the long sides 21L and short sides 21S that define the opening part 21A (26L<21L, 26S<21S).

Thereby, the edges 21E that define the opening 21A of the light guide 21 are not exposed, and the display quality can be improved. Similarly, it is preferable that the opening part 26A of the optical sheet 26 be formed to have dimensions less than the dimensions of the opening part 25A of the optical sheet 25. The dimensions of the opening part 21A may be equal to or different from the dimensions of the opening part 24A.

In a case where three or more optical sheets are disposed between the liquid crystal display panel 2 and the light guide 21, it should suffice if the respective optical sheets have openings that are opposed to the rotary reel 110 and the optical sheet, which is positioned most on the liquid crystal display panel 2 side, is so disposed as to cover the edges that define the openings of the other optical sheets. With this structure, the same advantageous effects as with the above-described example, in which the two optical sheets are disposed, can be obtained.

As has been described above, according to the liquid crystal display device of the present embodiment which is applicable to the game machine, the light guide 21 has the opening part which is opposed to the rotary reel. Thereby, the weight of the light guide is reduced, and accordingly the weight of the liquid crystal display device can be reduced. Since the rotary reel is visible without intervention of the backlight, the visibility of the rotary reel can be enhanced.

In addition, the plural sheets are disposed between the liquid crystal display panel and the light guide, and the emission light from the light guide is properly diffused or converged. Thereby, the emission light can efficiently be guided to the liquid crystal display panel, and the display quality, in particular, the luminance, of the image that is displayed on the image display section of the liquid crystal display panel can be improved.

Furthermore, even in the case where the plural optical sheets having the openings opposed to the rotary reel are disposed between the liquid crystal display panel and the light guide, the optical sheet, which is positioned most on the liquid crystal display panel side, is so disposed as to cover the edges that define the openings of the other optical sheets. Thereby, only the edges that define the single opening part are exposed. Therefore, the appearance of the part of the liquid crystal display panel, which is in the vicinity of the transmissive display section that makes the rotary reel visible, can be prevented from becoming poor.

The present invention is not limited to the above-described embodiment. In practice, the structural elements can be modified without departing from the spirit of the invention. Various inventions can be made by properly combining the structural elements disclosed in the embodiment. For example, some structural elements may be omitted from all the structural elements disclosed in the embodiment. Furthermore, structural elements in different embodiments may properly be combined.

What is claimed is:

1. A liquid crystal display device comprising:
   a transmissive liquid crystal display panel which is disposed on a front side of a display medium that effects variable display; and
   an area light source device which is disposed between the liquid crystal display panel and the display medium and illuminates the liquid crystal display panel from a back side thereof,
   the area light source device including:
   a light source;
   a light guide which has an opening part opposed to the display medium and emits radiation light from the light source toward the liquid crystal display panel; and
   a first optical sheet and a second optical sheet which are stacked between the liquid crystal display panel and the light guide and impart predetermined optical characteristics to emission light emerging from the light guide,
   wherein the first optical sheet is disposed on the liquid crystal display panel side, and the second optical sheet is disposed on the light guide side,
   each of the first optical sheet and the second optical sheet has opening part opposed to the display medium, and
   the first optical sheet is disposed to cover edges that define the opening part of the second optical sheet;
   wherein the opening part of each of the first optical sheet and the second optical sheet is substantially rectangular, and
   long sides and short sides, which define the opening part of the first optical sheet, are shorter than long sides and short sides which define the opening part of the second optical sheet.

2. The liquid crystal display device according to claim 1, wherein the opening part of the light guide is substantially rectangular, and
   long sides and short sides, which define the opening part of the first optical sheet, are shorter than long sides and short sides which define the opening part of the light guide.

* * * * *